United States Patent [19]

Okouchi et al.

[11] 4,245,998
[45] Jan. 20, 1981

[54] METHOD AND APPARATUS FOR CRYSTALLIZATION OF SOLUTION CONTAINING SALTS

[75] Inventors: Isao Okouchi, Hitachi; Kenkichi Izumi, Mito; Haruyuki Yamazaki; Sankichi Takahashi, both of Hitachi, all of Japan

[73] Assignees: Hitachi, Ltd.; Hitachi Plant Engineering and Construction Co., Ltd., both of Tokyo, Japan

[21] Appl. No.: 891,284

[22] Filed: Mar. 29, 1978

[30] Foreign Application Priority Data

Mar. 30, 1977 [JP]  Japan ................................. 52-34624
Mar. 30, 1977 [JP]  Japan ................................. 52-34625
Mar. 30, 1977 [JP]  Japan ................................. 52-34626

[51] Int. Cl.$^3$ .......................... B01D 1/14; B01D 9/02
[52] U.S. Cl. ..................................... 23/295 R; 23/307; 159/16 R; 159/29; 159/45; 159/47 R; 159/47 WL; 422/245; 422/307
[58] Field of Search ............. 23/302 R, 302 A, 302 T, 23/303, 304, 305 R, 305 A, 305 F, 305 RE, 307, 295 R; 165/2, 106, 108, 138; 159/16 R, 29, 45, 46, 47 R, 47 WL, 47 UA; 422/245, 252, 253, 307

[56] References Cited

U.S. PATENT DOCUMENTS

| | | | |
|---|---|---|---|
| 508,915 | 11/1893 | Cardozo | 23/303 |
| 2,468,455 | 4/1949 | Metziger | 23/302 R |
| 2,614,035 | 10/1952 | Robinson | 23/295 R |
| 3,402,025 | 9/1968 | Garrett et al. | 23/307 |
| 3,526,264 | 9/1970 | Young et al. | 23/307 |
| 3,775,065 | 11/1973 | Aoyama | 23/295 R |
| 3,918,916 | 11/1975 | Garrett | 23/302 R |
| 3,933,972 | 1/1976 | Bauwens et al. | 23/302 T |

*Primary Examiner*—Bradley R. Garris
*Attorney, Agent, or Firm*—Thomas E. Beall, Jr.

[57] ABSTRACT

To remove salts from a solution containing the salts, hot air is injected downwards into the solution in a concentrator, and the solution is concentrated by direct contact with the hot air, thereby enhancing an evaporation efficiency in the concentrator and preventing scale deposition in the concentrator and piping system. The solution is forcedly cooled in a crystallizer by direct contact with cool air, thereby making crystals grow in the solution within a short time. The solution and air are circulated in a closed cycle, thereby preventing a secondary environmental pollution.

4 Claims, 2 Drawing Figures

METHOD AND APPARATUS FOR CRYSTALLIZATION OF SOLUTION CONTAINING SALTS

LIST OF PRIOR ART REFERENCES (37 CFR 1.56(a))

The following references are cited to show the state of the art:
Japanese Patent Publication No. 16161/66
Japanese Patent Publication No. 5007/64

BACKGROUND OF THE INVENTION

This invention relates to a method and an apparatus for crystallization of a solution containing salts, and more particularly to a method and an apparatus for crystallizing salts as crystals by concentrating a solution containing salts by heating and then cooling the solution.

Recently a large amount of industrial waste water is discharged from factories owing to development and expansion of the industry, and soluble salts are contained in the industrial waste water. It is necessary to remove these salts to prevent environmental pollution.

The salts are usually removed from solutions as crystals, which method is called "crystallization of salts", wherein the property that the solubility of salt changes with a change in temperature of the solution is utilized, but deposition of scales on a heat transfer surface is a serious problem.

Japanese Patent Publication No. 16161/66 discloses an apparatus for crystallization of a solution containing salts, which has a concentrator for generating crystal nuclei, and a crystallizer for making the crystal nuclei grow into much larger crystals.

Japanese Patent Publication No. 5007/64 discloses an apparatus for concentrating a solution by indirect heating and vacuum evaporation. In the case of indirect heating, a heat exchanger is utilized, wherein a heat exchange is carried out between a solution containing salts which passes through the inside of the pipe and a hot heating medium which passes along the outside of the pipe, and thus crystals of salts are liable to deposit as scales on the inside wall of the pipe at the pipe outlet of the heat exchanger. In that case, the heat transfer area is reduced by the deposition of scales, resulting in decrease in heat transfer efficiency or deterioration in passage of the solution through the inside of the pipe. That is, the apparatus is sometimes damaged by increased pressure of the solution.

In the conventional crystallizer, the inside of the crystallizer is kept in vacuum or the solution merely left standing for settling, as shown in said Japanese Patent Publication No. 5007/64, and thus it takes inevitably much time in crystal growth. This is because the conventional crystallizer is directed to production of crystals with a uniform quality and size. However, in the crystallizer for the waste water treatment, it is necessary to remove a large amount of crystals from the solution within a short time. That is, it is necessary to cool the solution in the crystallizer uniformly within a short time.

SUMMARY OF THE INVENTION

An object of the present invention is to provide a method and an apparatus for removing a large amount of salts from a solution within a short time.

Another object of the present invention is to provide an apparatus for crystallization comprising a concentrator and a crystallizer having a good heat transfer efficiency.

Another object of the present invention is to provide an apparatus for crystallization without any deposition of scales at a heating location for the solution.

According to the present invention, the following effects can be obtained.

(1) A solution containing salts is heated by direct contact of the solution with a hot gas without a heat transfer wall of pipe, etc., and thus no scales are deposited at a heating location for the solution. Thus, the apparatus can be maintained simply and can be operated continuously for a long duration with a good efficiency. Thus, the present invention is suitable for treating waste water containing salts.

(2) To treat a large amount of solution as in the treatment of waste water, a large amount of hot gas is required. To obtain a sufficient amount of the gas, a gas injection velocity must be increased. When the hot gas is injected from a nozzle, scales are liable to deposit at a tip end of the nozzle, and thus a somewhat high gas injection velocity is required for preventing the scale deposition at the tip end of the nozzle. When the nozzle is open upwards in the solution, an increased gas injection velocity shortens a contact time of the solution with the hot gas, and the contacting of the solution with the hot gas is completed before the hot gas reaches a saturated state. As a result, the evaporation efficiency in the concentrator is lowered. On the other hand, when the nozzle is open vertically downwards, a contact time of the solution with the hot gas can be made long enough even if the injection velocity of the hot gas from the nozzle is increased, and thus the evaporation efficiency of the solution in the concentrator can be sufficiently enhanced. Furthermore, since a relatively high gas injection velocity can be obtained, a large amount of the solution can be treated and at the same time, the deposition of scales at the tip end of the nozzle can be prevented.

(3) The solution can be directly contacted with the hot gas injected vertically downwards, and the solution can be vigorously stirred thereby, and the solution can be uniformly heated. As a result, many crystal nuclei can be formed throughout the entire solution, and crystal growth can be much more promoted when the solution is led to the crystallizer.

(4) Since a cool gas is injected vertically downwards into the crystallizer to forcedly cool the solution, crystals can be made to grow within a short time. This is suitable for treating a large amount of waste water. Furthermore, stirring of the solution by the cool gas can make grain sizes of crystals uniform.

(5) The solution and the gas are circulated in a closed cycle, and thus harmful materials are not discharged therefrom, preventing a secondary environmental pollution.

Further objects and advantages of the invention will be apparent from a reading of the following detailed description of the preferred embodiments taken in conjunction with the accompanying drawings.

DESCRIPTION OF THE PREFERRED EMBODIMENT

Figure 1:
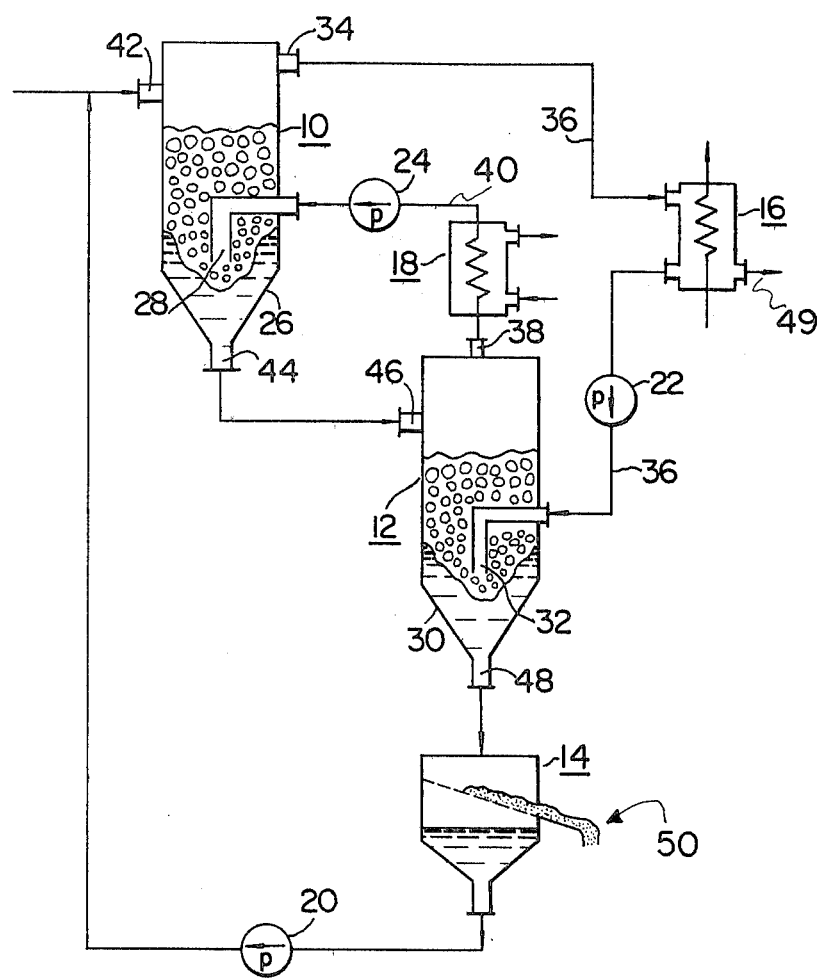
FIG. 1 is a cross-sectional view of an apparatus for crystallization of a solution containing salts according to the present invention.

In FIG. 1, an entire apparatus for crystallization is shown, which comprises a concentrator 10, a crystallizer 12, a separator 14, a condenser 16, a heater 18, pumps 20, 22 and 24, and a relevant piping system.

In the concentrator 10, a solution containing salts is concentrated by heating to form crystal nuclei of relative small grain sizes in the solution. The solution is heated and concentrated by direct contact with air heated to a high temperature. Since the air contains no harmful $SO_2$, NO, etc., it is most suitable for heating the solution. The concentrator 10 comprises a cylindrical vessel 26 and a nozzle 28 open vertically downwards at the bottom of the cylindrical vessel 26. When the solution is directly contacted with the hot air as in the present embodiment, scales are liable to deposit at the tip end of the nozzle 28, but flow velocity distribution or dynamic pressure distribution of air can be made uniform at the tip end of the nozzle 28 by tapering the tip end of the nozzle 28, and thus less peeling of the air within the nozzle 28 takes place. It has been confirmed that no scales are deposited at the tip end of the tapered nozzle 28.

In the crystallizer 12, the crystal nuclei formed in the concentrator 10 are further made to grow. The crystallizer 12 comprises a cylindrical vessel 30 and a nozzle 32 open vertically downwards at the bottom of the cylindrical vessel 30. The solution is forcedly cooled by direct contact with a cool air injected from the nozzle 32.

The separator 14 can be an ordinary settling type, and the condenser 16 is located in the flow path of pipe 36 connecting an air outlet 34 of the concentrator 10 to the nozzle 32 of the crystallizer 12. The heater 18 is located in the flow path of pipe 40 connecting an air outlet 38 of the crystallizer 12 to the nozzle 28 of the concentrator 10.

In the apparatus for crystallization of said structure, a solution containing salts is led to the concentrator 10 through a solution inlet 42. The solution in the concentrator 10 is heated, while being stirred by hot air injected vertically downwards from the nozzle 28. The hot air in a bubble state reaches a saturated state while ascending through the solution and leaves the concentrator 10 through the air outlet 34. On the other hand, the solution is concentrated to form crystal nuclei and leaves the concentrator 10 from a solution outlet 44.

The concentrated solution containing crystal nuclei is led to the crystallizer through a solution inlet 46. The concentrated solution in the crystallizer is forcedly cooled by cool air injected vertically downwards from the nozzle 32. The crystal nuclei in the solution grow into crystals of relatively large grain size while being cooled, and the crystals are led to the separator 14 from the crystallizer 12 through a solution outlet 48 together with the solution, and the crystals are separated from the concentrated solution in the separator 14. The separated crystals are discharged at 50 from the separator 14 for further utilization or waste disposal, whereas the separated concentrated solution is returned to the concentrator 10 by the pump 20. Thus, the solution is circulated in a closed cycle for repeated treatment, whereby a secondary environmental pollution can be prevented.

The air used for the heating and cooling of the solution is also circulated in a closed cycle. The air at a saturated state in the concentrator 10 is cooled in the condenser 16, whereby water vapor contained in the air is removed as condensate from line 49. The air freed from the water vapor is injected into the solution in the crystallizer 12 from the nozzle 32 by the pump 22 as a cool air to cool the solution. Then, the air leaves the crystallizer 12 and, after being indirectly heated in the heater 18, is returned to the concentrator 10 as the hot air.

Figure 2:
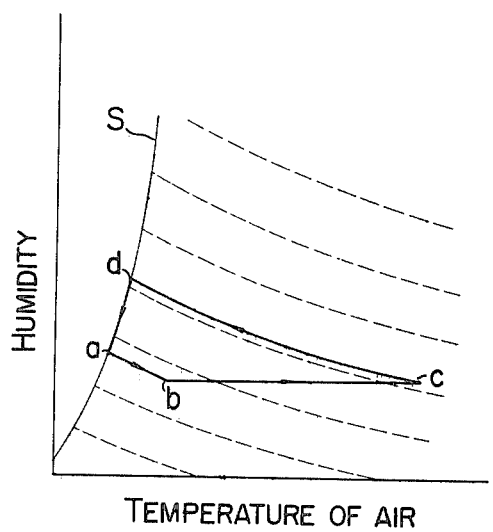
FIG. 2 is an air wetness diagram of the apparatus for crystallization according to the present invention.

The heat efficiency in the concentrator 10 can be the highest, when the evaporation proceeds until the hot air reaches a saturated state. In the apparatus for crystallization of the present invention, a saturated humid air can be obtained, as shown by a thick full line. In FIG. 2, a thin full line S is the saturation curve, and thin dotted lines are isoenthalpic curves. The air supplied to the crystallizer 12 is in a saturated state given by point a, and undergoes an isoenthalpic change from point a to point b in the crystallizer 12 to increase the wetness of air. In the heater 18, the air undergoes a change from point b to point c. In the concentrator 10 for concentrating the solution by direct contact of the solution with the hot air, the air undergoes an isoenthalpic change from point c to point d and is brought to a saturated state. Finally in the condenser 16, the air undergoes a change along the saturation curve S from point d to the original point a to form a closed cycle.

In the present apparatus for crystallization, evaporation proceeds in the concentrator 10 until the air reaches a saturated state, and thus a heat efficiency is high.

The present invention will be described in detail below, referring to Example.

EXAMPLE

A concentrator 10 and a crystallizer 12 each have a cylindrical vessel, 100 mm in inner diameter and 1,370 mm high. Air is injected from nozzles 28 and 32 each at an air injection velocity of 20 m/sec. An aqueous 15% $Na_2SO_4$ solution is treated.

That is, the $Na_2SO_4$ solution at 18° C. is heated to 53° C. by a hot air at 400° C. in the concentrator 10, and then led to the crystallizer 12, whereas the air turns to a saturated air at 54° C. in the concentrator 10 and is led to a condenser 16. The solution in the crystallizer 12 is cooled to 25° C. by cool air cooled to 18° C. in the condenser 16, whereas the air in the crystallizer 12 is heated to slightly higher than 18° C., and further heated to 400° C. in a heater 18. The solution is concentrated to the saturated solubility 33% from 15% during the operation, and deposited $Na_2SO_4$ crystals are removed.

In a continuous treatment at 50 kg/day (product $Na_2SO_4$ basis) for 216 hours, no change in pressure difference between the inside and the outside of the nozzle at the tip end thereof was observed before and after the treatment. This means that no scale deposition took place at the nozzle tip end where scales are most liable to deposit in the direct contact of the solution with the air. The absence of the scale deposition in the prolonged treatment means that the present invention is suitable for waste water treatment.

What is claimed is:

1. An apparatus for crystallization of a solution containing salts comprising:
   concentrator means for concentrating a solution containing salts by heating the solution, thereby forming crystal nuclei in the solution, said concentrator means having means for injecting a hot gas downwards into the solution containing salts thereby heating and concentrating the solution containing salts by direct contact with the hot gas, and said concentrator means providing the hot gas with water vapor evaporated from the solution as an output and concentrated solution with crystal nuclei as another output;
   crystallizer means for making the crystal nuclei formed in said concentrator means grow in the concentrated solution containing the crystal nuclei from the concentrator means, said crystallizer means having means for injecting a cool gas downwards into the concentrated solution thereby cooling the concentrated solution and growing crystals by direct contact with the cool gas, and said crystallizer means providing concentrated solution with grown crystals as an output and cool gas that has passed through the solution as an output;
   conduit means for conducting the concentrated solution output from said concentrator means to said crystallizer means;
   separator means for separating the crystals grown in the crystallizer means from the concentrated solution containing the grown crystals, said separator means providing separated solution as an output and separated crystals as an output;
   condensor means for cooling the hot gas containing water vapor from said concentrator means thereby separating the hot gas into a condensate output and a cool gas output;
   conduit means for conducting the cool gas output from said condensor means to the injecting means of said crystallizer means;
   conduit means for conducting the hot gas with water vapor output from said concentrator means to said condensor means;
   heater means for heating the cool gas output of said crystallizer means to provide a hot gas output;
   conduit means for conducting the hot gas output of said heater means to said injecting means of said concentrator means; and
   conduit means for conducting the cool gas output of said crystallizer means to said heater means.

2. The apparatus of claim 1, further including conduit means for conducting the separated solution output from said separator means to mix with the solution containing salts as an input to said concentrator means.

3. A method for crystallization of a solution containing salts, comprising the steps of:
   heating a solution containing salts by direct contact with a hot gas injected downwards into the solution containing salts to produce a hot gas with water vapor from the solution as an output and concentrated solution as an output;
   cooling the hot gas containing water vapor output from said heating step to thereby separate it into condensate and a cool gas;
   cooling the concentrated solution output from said heating step by direct contact with said cool gas injected downwards into the concentrated solution and thereby growing crystals within the solution;
   heating the cool gas effluent from said step of cooling the concentrated solution so as to produce a hot gas, and recirculating the thus produced hot gas to be used in said heating step; and
   separating the crystals grown during said step of cooling the concentrated solution from the concentrated solution.

4. The method of claim 3, further including the step of recirculating the solution from which the crystals have been separated by said step of separating back to said step of heating to be mixed with the solution containing salts.

* * * * *